(No Model.)
J. H. BRADY, W. A. WHITEHEAD & S. J. SHEA.
MUSIC CHART.
No. 506,971. Patented Oct. 17, 1893.
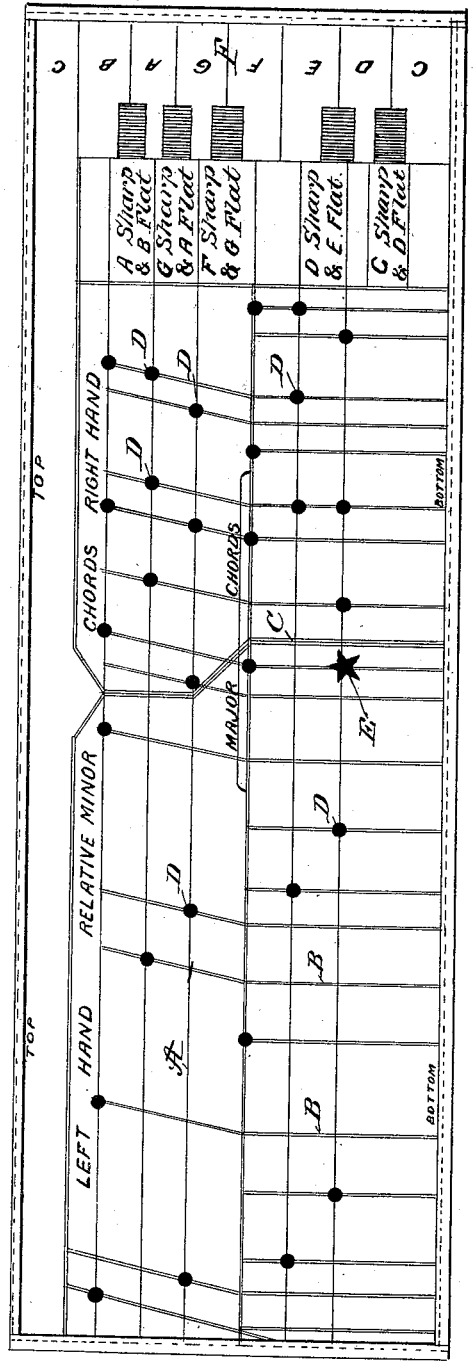
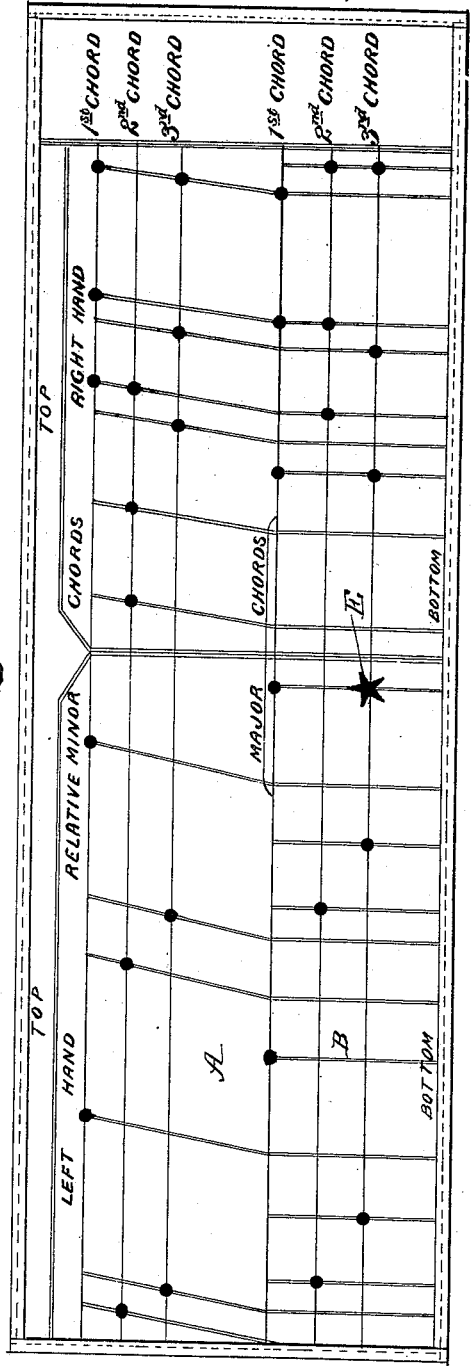

UNITED STATES PATENT OFFICE.

JAMES HENRY BRADY, WILLIAM A. WHITEHEAD, AND SAMUEL J. SHEA, OF FRANKFORT, KENTUCKY.

MUSIC-CHART.

SPECIFICATION forming part of Letters Patent No. 506,971, dated October 17, 1893.

Application filed October 10, 1892. Serial No. 448,473. (No model.)

*To all whom it may concern:*

Be it known that we, JAMES HENRY BRADY, WILLIAM A. WHITEHEAD, and SAMUEL J. SHEA, of Frankfort, in the county of Franklin and State of Kentucky, have invented a new and useful Improvement in Musical Charts, of which the following is a specification.

This invention is a musical chart by which to indicate clearly to an inexperienced person the keys, of a piano, organ or similar instrument, to be struck to produce the several major and minor chords of the key to which the chart has been applied as more fully described hereinafter, and the invention consists in the novel construction and combination of parts hereinafter described and pointed out in the claims.

In the drawings—Figure 1 is a face view of one side of the chart, and Fig. 2 is a similar view of the opposite side of the chart.

The chart is provided with the longitudinal or horizontal lines A and the transverse or cross lines B and has the division line C, the purpose of the latter being to separate the right hand chords from those of the left. Usually we employ six horizontal lines A, three for the major chords and three for the minor chords and place over the three major lines, the permanent heading "Major chords" and over the three minor lines the permanent heading "Relative minor chords." Over the spaces to the right and left of the division line C are placed respectively the permanent headings "Right hand" and "Left hand." The cross lines B are preferably made vertical or at right angles to the lines A across the major chord or lower section of the chart and inclined at an angle across the upper or minor chord section, thus distinguishing at a glance the major and minor chords. On the cross lines B at the intersections of the lines A I place at proper points heavy dots D or other characters, the dots D on each line A indicating by the lines B running down therefrom the keys of the instrument to be played to produce the chord. It will be seen that three major and three minor chords are provided the chords of each set being designated at one end of the chart on one side by the permanent designations "1st chords." "2nd. chords" and "3rd. chords."

A guide designation E is provided on the chart in proper relation to the chord spots, to enable the chart to be applied accurately to a key board. This guide designation is preferably in the nature of a star as shown.

To enable a person not acquainted with the piano key board to find any key thereon, we provide at one end of the chart on one side a representation F of one octave of a key board. The several keys of this representation F are marked with the letters D D, &c., of the keys. By placing this representation F on a piano or organ key board and moving it therealong until the black and white keys correspond or register with those of the instrument the letters on the chart will indicate the key C, D or other key desired, then such key may be depressed by the thumb of the left hand and the chart turned to position for use and its star E adjusted over such key when the dots will indicate the keys to be played to produce the chords desired.

It will be understood that the chart should be made of heavy card board or other stout material and be bound to protect it from wear. The chart is usually about twenty three inches long and six inches wide and in use is placed edgewise upon the rear portion of the key board.

Having thus described our invention, what we claim as new, and desire to secure by Letters Patent, is—

1. The musical chart herein described, divided into major and minor sections and provided with the series of horizontal lines and with the cross lines intersecting the same, said lines being arranged for a part of their length or across one of said sections at right angles to the horizontal lines and for a part of their length or across the other section oblique to said horizontal lines and provided upon said sections with the indicating characters substantially as set forth.

2. The improved musical chart herein described, provided on its opposite sides with the longitudinal and cross lines and divided into major and minor sections with the cross lines over one of said sections at right angles to and over the other section inclined or oblique to the horizontal lines and provided with the chord indicating characters and the permanent headings Major chords, Relative minor chords, Left hand, Right hand, 1st. chord, 2nd. chord and 3rd. chord and having on one side along the end, the representation of a part of a key board all substantially as set forth.

JAMES HENRY BRADY.
WILLIAM A. WHITEHEAD.
SAMUEL J. SHEA.

Witnesses:
   JOHN L. SCOTT, Sr.,
   CHAS. F. EXUM.